United States Patent [19]

Etancelin

[11] 4,237,628
[45] Dec. 9, 1980

[54] DEVICE FOR PROTECTING CYCLIST FEET

[75] Inventor: Christian Etancelin, Vernon, France

[73] Assignee: Les Manufactures de Saint Marcel, St. Marcel, France

[21] Appl. No.: 84,027

[22] Filed: Oct. 11, 1979

[51] Int. Cl.³ .......................... A43B 5/00; A43B 3/18; A43B 13/22
[52] U.S. Cl. ........................................ 36/131; 36/7.2; 36/72 R
[58] Field of Search .................. 36/131, 7.2, 7.4, 72 R

[56] References Cited

U.S. PATENT DOCUMENTS

| 1,592,110 | 7/1926 | Joseph | 36/7.4 |
| 2,836,908 | 6/1958 | Alinger | 36/72 R |
| 3,812,606 | 5/1974 | Merola | 36/131 |

Primary Examiner—Patrick D. Lawson
Attorney, Agent, or Firm—Seidel, Gonda, Goldhammer & Panitch

[57] ABSTRACT (a) A device for protecting cyclist feet;
(b) wherein there is a sleeve wrapping the extremity of the foot up to the opening of the shoe, as well as means for fixing said sleeve to the pedal of a cycle.

7 Claims, 3 Drawing Figures

DEVICE FOR PROTECTING CYCLIST FEET

The present invention relates to a device for protecting cyclist feet.

The device provided by the invention consists of a sleeve wrapping the extremity of the foot up to the opening of the shoe, as well as of a means for fixing said sleeve to the pedal of a cycle.

According to a further feature of the invention, the sleeve is shaped in such a way that it surrounds, at least partly, the lower face of the pedal.

According to a further feature of the invention, the means provided for fixing the sleeve co-operate with the toe clip fitted to the pedal.

According to a further feature of the invention, the means for fixing the sleeve co-operate with the belt of the toe clip fixed to the pedal.

According to a further feature of the invention, the sleeve carries an external edge on the upper edge and on the sides of the opening of the shoe.

The invention is presented by way of a non-limitative example in the attached drawings, wherein:

FIG. 3 is a diagrammatical longitudinal cross-section view of a mode of embodiment of the device.

Consequently, the present invention is aimed at making a device which ensures the protection of the feet of cyclists against the rain and the cold without interfering with the positioning and bearing of the foot on the pedal of the cycle and also and possibly without interfering with the gripping, clamping and unclamping of the belt of the toe clip that said pedal could carry.

The device provided by the invention consists of a sleeve made of plastic material or rubber, transparent or not, shaped in such a way that it wraps the extremity of the opening of the shoe.

Said sleeve is made in one piece through molding or shaping and also carries means for its fixing to the pedal of a cycle.

Figure 1:
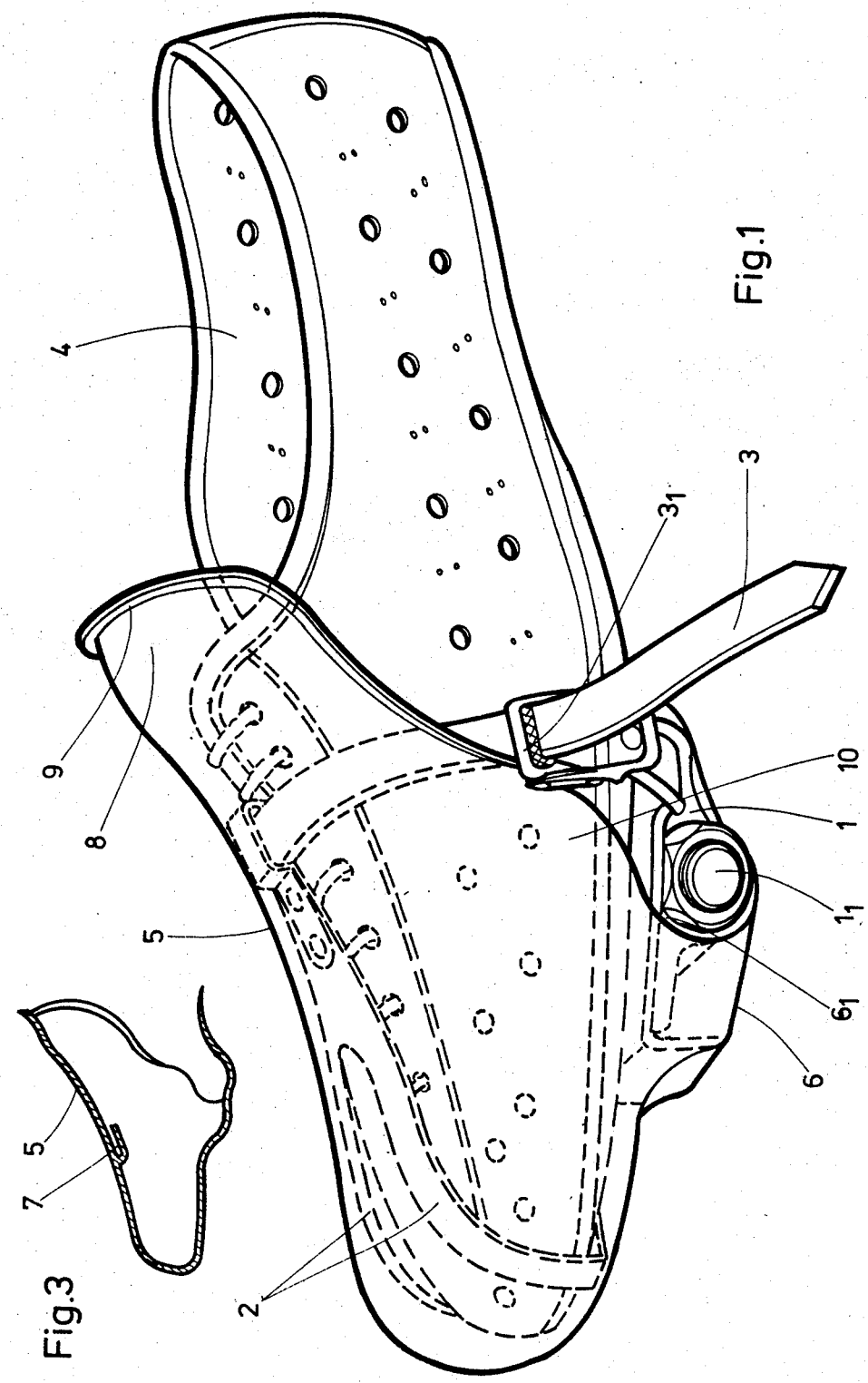
FIG. 1 is a perspective view of the device adapted to a pedal of a cycle.
Figure 2:
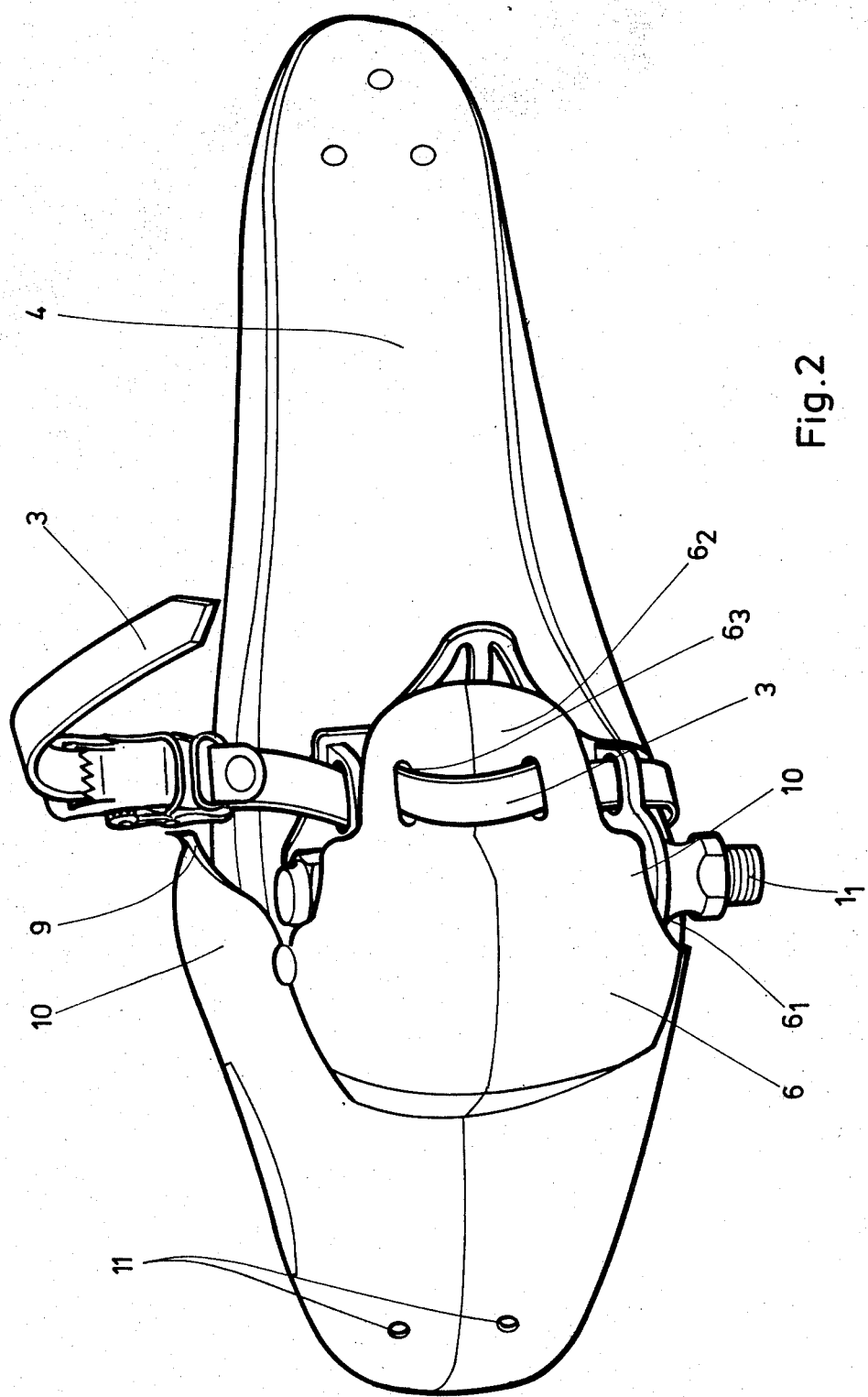
FIG. 2 is a view from beneath of FIG. 1.

Thus, as shown in FIGS. 1 and 2, the sleeve is adapted to the pedal 1 of a cycle on which besides a toe clip consisting of blades 2 and a belt 3 is fixed.

Also, said FIGS. 1 and 2 show a shoe applied onto the pedal 1 and located inside the toe clip, and then inside the sleeve.

Said sleeve 5 carries means for its fixing to the pedal itself and/or to the toe clip so as to keep it in position.

In the example shown, the sleeve 5 is made in such a shape that its lower edge surrounds at 6 the lower face of the pedal, leaving the axis $1_1$ which fixes the pedal to the crank-gear pass through a detachment $6_1$.

This portion of the sleeve 5 which surrounds the pedal ends in a tongue $6_2$ carrying openings $6_3$ constituting a passage for the belt 3 of the toe clip.

Thus, in such an arrangement, the sleeve 5 is fixed to the pedal 1 through the belt of the toe clip, and this beneath said pedal so as not to interfer with the foot of the cyclist and also so as not to interfer with the working of the belt of the toe clip.

Also, the sleeve can be fixed to the pedal by means of a tongue 7 provided inside said sleeve 5 which embeds under the blades 2 of the toe clip.

The sleeve 5 extends above up to the opening of the shoe by forming a tongue 8 whose upper edge and the sides carry an external edge 9 designed to prevent the water from running over the foot and, on the contrary, to facilitate the flow of the water towards the sides of the sleeve.

Said sides, which are cleared for leaving passage to the belt of the toe clip and the clamping clip $3_1$ of same, are internally turned up at 10 at the opening of the shoe so that said sides fully apply against the shoe 4 and the pedal 1 and do not rub against the pedal-crank.

Also, perforations are provided in the sleeve so as to permit the ventilation of the foot and said perforations are preferably made on the lower face of the sleeve such as shown at 11 in FIG. 2.

What I claim is:

1. A device for protecting cyclist feet, consisting of a sleeve or shoe fixed to the pedal of the cycle and wrapping the extremity of the foot up to the opening of the shoe, as well as, at least partly, the lower face of the pedal, a device wherein said sleeve carries an external edge on its upper edge and the sides of the opening of the shoe.

2. A device according to claim 1, wherein the means for fixing the sleeve to the toe clip consist of at least a sliding keeper for the belt of said toe clip.

3. A device according to claim 2, wherein said sliding keeper is made on the portion of the sleeve surrounding the pedal.

4. A device according to claim 1, wherein the means for fixing the sleeve to the toe clip consist of a tongue located inside said sleeve and which receives the blades of the toe clip.

5. A device according to claim 1, wherein the lateral sides of the sleeve are internally turned up at the opening of the shoe.

6. A device according to claim 1, wherein the sleeve carries perforations.

7. A device according to claim 6, wherein the perforations are made on the lower face of the sleeve.

* * * * *